J. WISDA.
Brace for Thrashing-Machines.

No. 203,398. Patented May 7, 1878.

WITNESSES:
Henry N. Miller
C. Sedgwick

INVENTOR:
J. Wisda
BY Munn & Co
ATTORNEYS.

UNITED STATES PATENT OFFICE.

JOHN WISDA, OF DEFIANCE, OHIO.

IMPROVEMENT IN BRACES FOR THRASHING-MACHINES.

Specification forming part of Letters Patent No. 203,398, dated May 7, 1878; application filed April 2, 1878.

*To all whom it may concern:*

Figure 1:
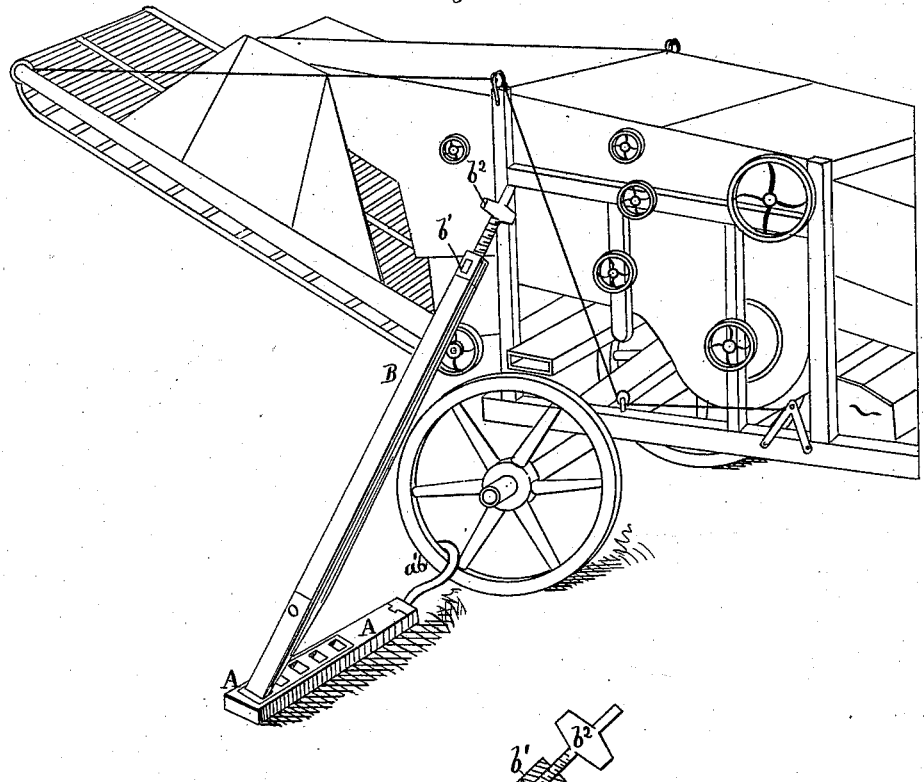
Figure 2:
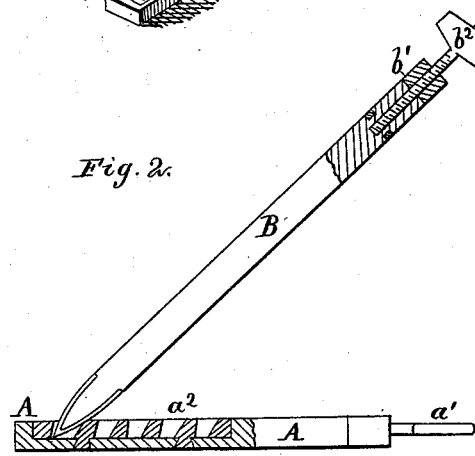

Be it known that I, JOHN WISDA, of Defiance, in the county of Defiance and State of Ohio, have invented a new and useful Improvement in Braces for Machines for Thrashing Grain, Hulling Clover, &c., of which the following is a specification:

Figure 1 is a perspective view of my improved brace, illustrating its use. Fig. 2 is a side view of the same, partly in section, to show the construction.

Similar letters of reference indicate corresponding parts.

The object of this invention is to furnish an improved brace for holding grain-thrashers, clover-hullers, and other large and heavy machines steady while being used, which shall be simple in construction, conveniently used and adjusted, and effective in operation.

The invention consists in the brace formed of the base-bar, provided with a hook at its inner end, and the notches in its upper side, and the inclined bar having its lower end made wedge-shaped and provided at its upper end with a nut and hand-screw, as hereinafter fully described.

A is the base-bar of my improved brace, which may be made of any desired or convenient size, and to its inner end is firmly attached a hook, $a^1$, to be hooked upon a wheel of the machine to be held.

The bar A is laid upon the ground, and in the upper side of its outer part are formed notches $a^2$ to receive the wedge-shaped lower end of the bar B. To the upper end of the bar B is secured a nut, $b^1$, into which is screwed a hand-screw, $b^2$, having a point formed upon its outer end, so that it may be turned while resting against the frame of the machine.

In using the brace the hook $a^1$ is hooked upon a wheel of the machine, the bar A is laid upon the ground, the lower end of the bar B is inserted in one of the notches $a^2$ of the said bar A, and the end or point of the hand-screw $b^2$ is placed against the frame of the machine. The said screw $b^2$ is then turned until the machine is firmly held. One or more of these braces should be placed at each side of the machine, so that it may be held firmly and steadily in place.

Having thus described my invention, I claim as new and desire to secure by Letters Patent—

The brace formed of the base-bar A provided with the hook $a^1$ at its inner end and the notches $a^2$ in its upper side, and the inclined bar B having its lower end made wedge-shaped and provided at its upper end with a nut, $b^1$, and hand-screw $b^2$, substantially as herein shown and described.

JOHN WISDA.

Witnesses:
 JOHN D. LAMB,
 L. G. COSGROVE.